Figure 1:
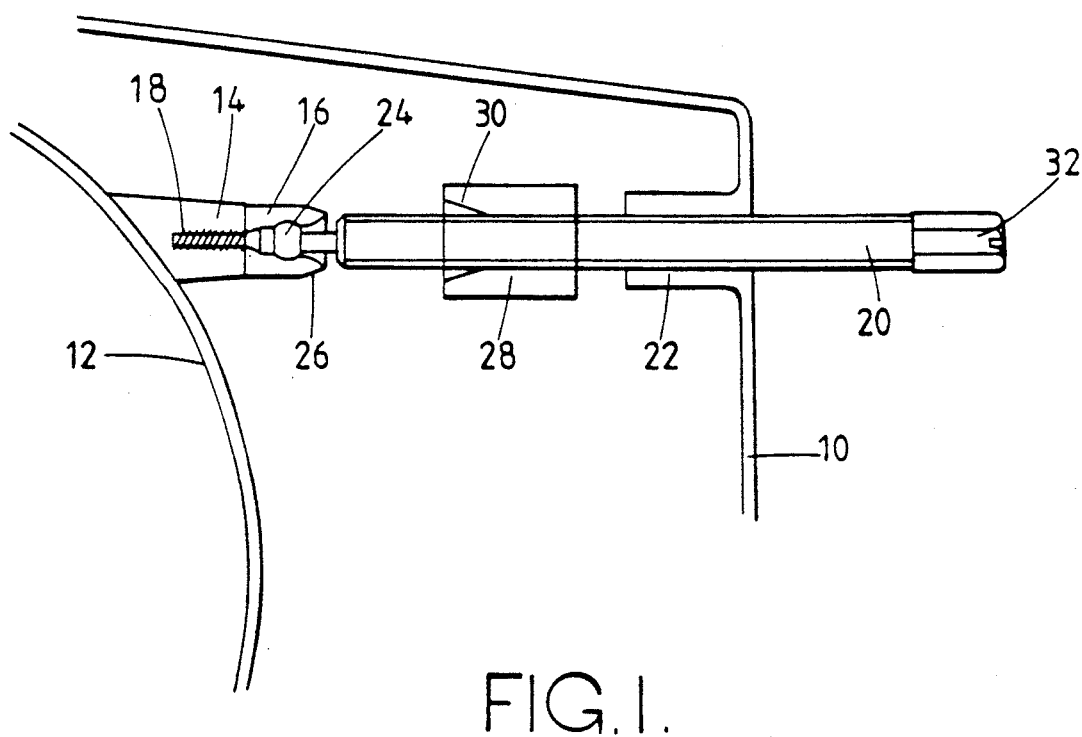

United States Patent [19]

Osborn

[11] Patent Number: 5,065,298
[45] Date of Patent: Nov. 12, 1991

[54] LAMP ASSEMBLY

[75] Inventor: Graham S. Osborn, Brownhills, England

[73] Assignee: Carello Lighting plc, Straffordshire, England

[21] Appl. No.: 618,718

[22] Filed: Nov. 27, 1990

[30] Foreign Application Priority Data

Dec. 5, 1989 [GB] United Kingdom ............... 8927485.6

[51] Int. Cl.$^5$ .............................................. F21V 17/02
[52] U.S. Cl. ..................................... 362/421; 362/66; 362/270
[58] Field of Search ............... 362/421, 418, 270, 319, 362/61, 66

[56] References Cited

U.S. PATENT DOCUMENTS

| 3,752,976 | 8/1973 | Di Salvo et al. | 362/418 |
| 4,831,502 | 5/1989 | Fujino et al. | 362/61 |
| 4,839,785 | 6/1989 | Ohishi | 362/418 |
| 4,849,860 | 7/1989 | Schauwecker | 362/421 |
| 4,884,174 | 11/1989 | Dorleans | 362/61 |
| 4,974,123 | 11/1990 | Luallin et al. | 362/66 |

FOREIGN PATENT DOCUMENTS

| 3238104 | 3/1984 | Fed. Rep. of Germany | 362/61 |
| 3533118 | 3/1987 | Fed. Rep. of Germany | 362/66 |
| 330885 | 9/1989 | Fed. Rep. of Germany | 362/61 |
| 2488198 | 2/1982 | France | 362/66 |
| 2609763 | 7/1988 | France | 362/66 |

Primary Examiner—Ira S. Lazarus
Assistant Examiner—Y. Quach
Attorney, Agent, or Firm—Trexler, Bushnell, Giangiorgi & Blackstone, Ltd.

[57] ABSTRACT

A lamp assembly has a supporting housing containing a lamp reflector body adjustably mounted therein through a mounting arrangement. The mounting arrangement includes a socket fixed to the body and an adjusting screw rotatably mounted in a sleeve of the housing and having a part-spherical end which is a snap-fit in the socket. To prevent accidental disengagement of the part-spherical end from the socket when the screw had been moved beyond a predetermined position, a member with a frusto-conical recess is slidably mounted on the screw and engages over the socket to prevent it from opening.

3 Claims, 1 Drawing Sheet

LAMP ASSEMBLY

This invention relates to a lamp assembly of the type in which a reflector body is adjustably mounted relative to a support by mounting means including a socket carried by the reflector body and an adjusting screw rotatably mounted on the support, the adjusting screw having a part-spherical end which is a snap fit in the socket. A lamp assembly having mounting means of this type is commonly used in motor vehicle lamp assemblies, particularly motor vehicle headlamp assemblies, where two such adjusting screws and sockets are provided for enabling the reflector body to be tilted independently about horizontal and vertical axes for headlamp beam adjusting purposes. It is a disadvantage of previously proposed lamp assemblies of this type that, when the adjusting screw is moved beyond its design limit, the part-spherical end can become detached from its socket.

It is an object of the present invention to obviate or mitigate the above disadvantage.

According to the present invention, there is provided a lamp assembly comprising a support, a lamp reflector body, and mounting means adjustably mounting the reflector body on the support, said mounting means including a socket carried by the reflector body and an adjusting screw rotatably mounted on the support, said adjusting screw having a part-spherical end which is a snap fit in the socket, characterized in that means are provided for limiting opening of the socket, said limiting means being adapted to be in engagement with said socket when the adjusting screw has moved beyond a predetermined position in a direction tending to separate the part-spherical end from the socket.

In a convenient embodiment, the limiting means includes a tapered internal surface against which a tapered external surface of the socket is adapted to engage when the adjusting screw is in said predetermined position.

The limiting means may be provided by a member which is slidably mounted on the adjusting screw and which is in abutment with the support when the adjusting screw is in its predetermined position.

Figure 2:
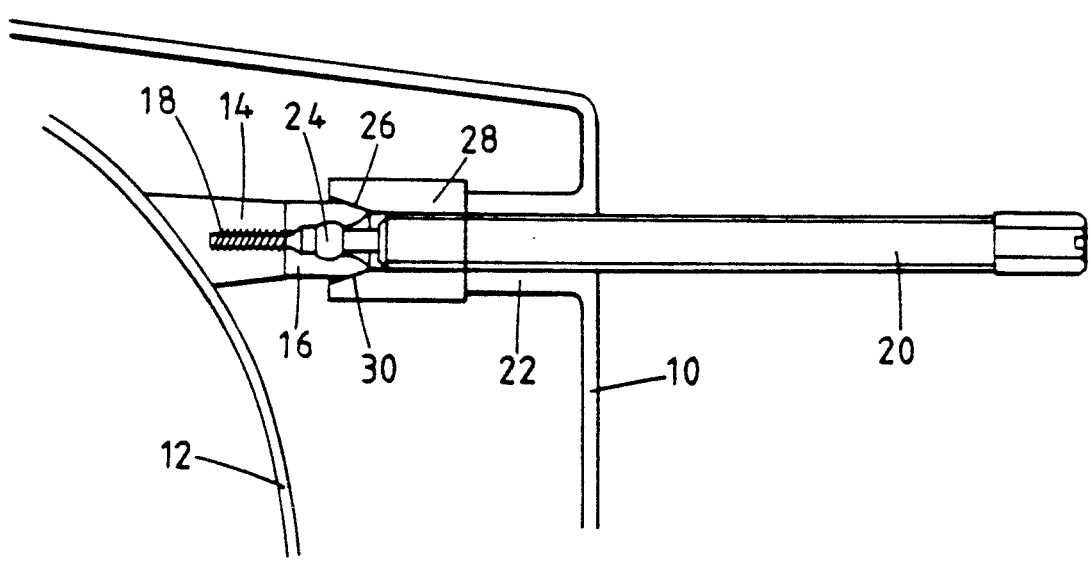

An embodiment of the present invention will now be described, by way of example, with reference to the accompanying drawing, in which:

FIG. 1 is a perspective view of part of a lamp assembly according to the present invention showing an adjusting screw in a position in which it has not reached a predetermined limit position, and FIG. 2 is a view similar to FIG. 1 showing the adjusting screw in its predetermined limit position.

The lamp assembly illustrated in FIGS. 1 and 2 is a motor vehicle headlamp assembly comprising a support 10 in the form of a synthetic resin housing which is fixedly mounted in a manner known per se on the motor vehicle. A dished reflector body 12 is disposed within the housing 10. The reflector body 12 is conveniently formed of an injection moulded thermosetting plastics material with three integral mounting lugs 14 (only one shown) extending rearwardly therefrom. Each mounting lug 14 has a resilient, synthetic resin socket 16 secured thereto by means of a screw 18. The three sockets 16 form part of a three-point mounting system whereby the reflector body 12 is adjustably mounted in the housing 10 for independent pivotal movement about horizontal and vertical axes for beam aiming purposes. Such a three-point mounting system is per se known. One of the mounting points is provided by a post (not shown) which is fixedly secured to the housing 10 and which has a part-spherical end which is snap fitted into the respective socket. The other two mounting points (of which one only is illustrated) enable tilting of the reflector body 12 about the respective horizontal and vertical axes. To permit this, an externally screw threaded adjusting rod 20 extends through the housing 10 and engages in an internally screw threaded sleeve 22 integrally formed within the housing 10. An inner end of the adjusting screw 20 is provided with a part-spherical end 24 which is snap fitted into the socket 16, the latter being partly split to permit outward deformation of the wall of the socket during snap-fitting of the part-spherical end 24 therein. The outer surface 26 of the socket 16 is frusto-conically tapered.

The lamp assembly further comprises limiting means in the form of a sleeve 28 having a frusto-conically tapered internal surface corresponding to the tapered outer surface 26 of the socket 16. The surfaces 26 and 30 face each other. The sleeve 28 is slidably mounted on the adjusting screw 20. The outer end portion 32 of each adjusting screw 20 has a hexagonal form and is also slotted to enable the adjusting screw 20 to be rotated either by means of a spanner or by means of a screwdriver.

In use, the adjusting screw 20 will normally be in the position illustrated in FIG. 1. However, if during adjustment of the reflector body 12 for beam aiming purposes, the adjusting screw 20 is rotated in an anticlockwise direction out of the housing 10 to a predetermined limit position as illustrated in FIG. 2, the sleeve 28 abuts against the inner end of sleeve 22 and the outer frusto-conical surface 26 of the socket 16 becomes engaged against the inner frusto conical surface 30 of the sleeve 28. In such position, it will be appreciated that outward deformation of the walls of the socket 16 is prevented, thereby preventing inadvertent disengagement of the part-spherical end 24 therefrom. In an alternative embodiment, the sleeve 28 is dispensed with and the sleeve 22 is extended further inwardly and provided with an inner frusto-conical surface like surface 30. Thus, the sleeve 22 serves the dual purpose of supporting the adjustment screw 20 for rotation and of defining the means for limiting opening of the socket 16.

What is claimed is:

1. A lamp assembly comprising a support (10), a lamp reflector body (12), and mounting means adjustably mounting the reflector body (12) on the support (10), said mounting means including a socket (16) carried by the reflector body (12) and an adjusting screw (20) rotatably mounted on the support (10), said adjusting screw (20) having a part-spherical end (24) which is a snap fit in the socket (16), characterized in that means (28) are provided for limiting opening of the socket (16), said limiting means (28) comprising a limiting member (28) slidably mounted on the adjusting screw (20) and being adapted to be in engagement with said socket (16) when the adjusting screw (20) has moved beyond a predetermined position in a direction tending to separate the part-spherical end (24) from the socket (16) and said limiting member (28) being in abutment with the support (10) when the adjusting screw (20) is in said predetermined position.

2. A lamp assembly as claimed in claim 1, wherein the limiting member (28) includes a tapered internal surface (30) against which a tapered external surface (26) of the socket (16) is adapted to engage when the adjusting screw (20) is in said predetermined position.

3. A lamp assembly as claimed in claim 1 or 2, wherein the limiting member is provided by an extended sleeve which is fixed relative to the support and through which the adjusting screw passes.

* * * * *